(12) United States Patent
Nishimura

(10) Patent No.: US 6,671,031 B1
(45) Date of Patent: Dec. 30, 2003

(54) METHOD FOR MANUFACTURING POLARIZATION DIFFRACTION FILM

(75) Inventor: Suzushi Nishimura, Yokohama (JP)

(73) Assignee: Nippon Mitsubishi Oil Corporation, Minato-ku (JP)

( * ) Notice: Subject to any disclaimer, the term of this patent is extended or adjusted under 35 U.S.C. 154(b) by 88 days.

(21) Appl. No.: 09/649,408

(22) Filed: Aug. 28, 2000

(30) Foreign Application Priority Data

Aug. 26, 1999 (JP) ............................................. 11-240583
Aug. 27, 1999 (JP) ............................................. 11-241794

(51) Int. Cl.$^7$ ............................................. G02F 1/1333
(52) U.S. Cl. ........................ 349/201; 359/566; 349/187
(58) Field of Search ................................. 349/187, 200, 349/201; 359/566, 567, 568

(56) References Cited

U.S. PATENT DOCUMENTS

| | | | | |
|---|---|---|---|---|
| 5,218,045 A | * | 6/1993 | Jones et al. ..................... | 525/69 |
| 5,339,306 A | * | 8/1994 | Yoshinaga et al. ........ | 369/275.1 |
| 5,385,690 A | * | 1/1995 | Finkelmann et al. .. | 252/299.01 |
| 6,007,738 A | * | 12/1999 | Shimamoto et al. ... | 252/299.01 |
| 6,061,122 A | * | 5/2000 | Hoshino et al. ............... | 356/71 |
| 6,144,428 A | * | 11/2000 | Schadt et al. ................ | 349/113 |
| 6,180,028 B1 | * | 1/2001 | Hotaka et al. ......... | 252/299.66 |

FOREIGN PATENT DOCUMENTS

| | | |
|---|---|---|
| JP | 3-248189 | 11/1991 |
| JP | 5-279492 | * 10/1993 |
| JP | 9-157652 | 6/1997 |
| JP | 9-227867 | 9/1997 |
| JP | 9-281330 | * 10/1997 |
| JP | 10-188321 | * 7/1998 |

* cited by examiner

Primary Examiner—Kenneth Parker

(57) ABSTRACT

According to the present invention, a method is provided for manufacturing a polarization diffraction film, which comprises the steps of forming a film with a liquid crystal material containing a liquid crystalline polymer and a crosslinkable substance, fixing a cholesteric alignment formed with the liquid crystal material, crosslinking the liquid crystal material to form a liquid crystal film and providing a region exhibiting a diffraction-capability on at least a part of the liquid crystal film or polarization diffraction film or comprises the steps of forming a film with a liquid crystal material containing a polymeric liquid crystal and a crosslinkable substance, crosslinking the liquid crystal material in a cholesterically aligned state so as to form a liquid crystal film with a cholesteric alignment fixed and providing a region exhibiting a diffraction capability on at least a part of the liquid crystal film.

18 Claims, No Drawings

METHOD FOR MANUFACTURING POLARIZATION DIFFRACTION FILM

BACKGROUND OF THE INVENTION

1. Field of the Invention

This invention relates to a method for manufacturing a polarization diffraction film which is excellent in heat resistance and generates diffracted light with a polarizability.

2. Description of the Prior Art

Diffraction elements are general-purpose optical elements which have been widely used for the purpose of spectrally splitting light or dividing luminous flux in the fields of spectroscopic optics and the like.

The diffraction elements are classified into some types according to their shapes. In general, they are classified into an amplitude type diffraction element having light-transmitting parts and non-light-transmitting parts which are periodically arranged, and a phase type diffraction element having grooves periodically formed on a high-transmittance material.

Alternatively, they may sometimes be classified into a transmission type diffraction element and a reflection type diffraction element according to the direction in which diffracted light is generated.

With the conventional diffraction elements as described above, the diffracted light obtained when ambient light, i.e. unpolarized light is made incident on the elements is restricted to unpolarized light.

With a polarizing instrument such as an ellipsometer frequently used in the fields of spectroscopic optics, the diffracted light can not be polarized. For this reason, there is generally employed a method in which the natural light emitted from a light source is spectrally split through a diffraction element and further in order to utilize only a specific polarization component contained therein, the diffracted light is made to pass through a polarizer to be used.

With this method, there is a problem that the quantity of light is reduced by half because about 50% or more of the resulting diffracted light is absorbed by the polarizer. Due to this problem, it is also required to prepare a detector with a high sensitivity and a light source capable of producing a large quantity of light.

Further, since the diffraction elements are often used in the optical field and design field including optical elements and optoelectronic elements and in recent years even in the security field, the diffraction elements themselves are required to have a certain degree of thermal and mechanical resistance.

Under such circumstances, there has been a demand for the development of a diffraction element which is excellent in thermal and mechanical resistance for ensuring the applicability of the elements in various fields and the resulting diffracted light itself becomes specific polarized light such as circularly polarized light or linearly polarized light.

BRIEF SUMMARY OF THE INVENTION

The present invention has been achieved in view of the foregoing problems. It is therefore an object of the present invention to provide a method for manufacturing a polarization diffraction film which is excellent in heat resistance and produces diffracted light having a polarizability.

The present inventors have found that a polarization diffraction film having an excellent heat resistance performance and a novel optical performance, i.e. a polarization diffraction property can be manufactured by imparting a diffraction capability to a cholesteric liquid crystal film combining an optical performance and a heat resistance performance, formed from a liquid crystal material containing a crosslinkable substance and thereby completed the present invention.

Namely, the method according to the present invention comprises the steps of forming a film with a liquid crystal material containing a liquid crystalline polymer and a crosslinkable substance; fixing a cholesteric alignment formed with the liquid crystal material; crosslinking the material to form a liquid crystal film; and providing a region exhibiting a diffraction capability on at least a part of the film thus obtained.

Another method for manufacturing a polarization diffraction film according to the present invention comprises the steps of forming a film with a liquid crystal material containing a liquid crystalline polymer and a crosslinkable substance; crosslinking the material which is in a cholesterically aligned state to form a liquid crystal film with a cholesteric alignment fixed: and providing a region exhibiting a diffraction capability on at least a part of the film thus obtained.

DETAILED DESCRIPTION OF THE INVENTION

Below, the present invention will be described in details.

The liquid crystal material to be used in the present invention contains a liquid crystalline polymer and a crosslinkable substance.

No particular limitation is imposed on the liquid crystalline polymer as long as it is a main chain type and/or side chain type liquid crystalline polymer compound or a liquid crystalline oligomer, all exhibiting a nematic liquid crystal phase or a cholesteric liquid crystal phase, or a composition containing a copolymer or mixture thereof.

Eligible main chain type liquid crystalline polymers exhibiting a nematic liquid crystal phase are polyamide, polyamic acid, polyimde, polyester, polyether, polysulfide and cellulose derivatives.

Among these liquid crystalline polymers, the liquid crystalline polyester is preferred from the following viewpoint.

That is, the polyester is generally comprised of an aromatic or aliphatic diol unit, an aromatic or aliphatic dicarboxylic acid unit or an aromatic or aliphatic hydroxycarboxylic acid unit. The polymeric terminal ends of the polymer are often a hydroxycarbonyl group (carboxyl group) or a hydroxy group, i.e., the reactive group of the unit monomer.

These terminal functional groups participate as a crosslinking ends in the reaction with the crosslinkable substances described below, or catalytically act on the reaction of the crosslinkable substance itself so as to facilitate the crosslinking. Further, the liquid crystalline polyester has an excellent alignment and is relatively easy to synthesize. For these reasons, the liquid crystalline polyester can be exemplified as a desirable liquid crystalline polmer in the present invention.

The liquid crystalline polyester employable for the present invention is desirably in the range of generally 10 to 1,000 $\mu$mol/g, preferably 30 to 500 $\mu$mol/g, and more preferably 50 to 300 $\mu$mol/g in terms of terminal carboxylic acid equivalent weight per polymer weight.

The main chain type liquid crystalline polymer employable for the present invention can be obtained with ease by a known condensation polymerization method and an acid chloride method but is not restricted by these synthesis method.

Specific examples of the side chain type liquid crystalline polymer exhibiting a nematic liquid crystal phase include those each having such a structure that polysiloxane, polyacrylate, polymethacrylate or polymalonate is a main chain and a low molecular weight liquid crystal compound comprised of a para-substituted cyclic compound as a mesogen is bonded, if required, via a spacer comprised of conjugated atomic groups to the main chain.

Preferred para-substituted cyclic compounds are those capable of exhibiting a nematic liquid crystal phase. Specific examples of such compounds are those having the para-substituted aromatic units of azometine, azo, azoxy, ester, substituted or non-substituted phenylene, substituted or non-substituted biphenyl, terphenyl, phenylcyclohexane, substituted or non-substituted naphthalene and anthracene types and substituted cyclohexane ring units of 1,4-substituted cyclohexane and bicyclohexane types.

In the present invention, the compounds having the para-substituted aromatic units of the phenylene, biphenyl and naphthalene types are particularly preferred form the viewpoints of the nematic liquid crystallinity and the availability of the materials.

Examples of the terminal substituent at the para position, i.e., at the site of the carbon more distant from the carbon bonded to the main chain or spacer or at the site of the carbon most distant from the main chain when a plurality of cyclic compounds are used, in the para-substituted cyclic compound include a nitro group, a cyano group, an alkyl group having 1 to 18 carbon atoms, an alkoxy group having 1 to 18 carbon atoms, an alkylthio group having 1 to 18 carbon atoms, an alkoxycarbonyl group having 2 to 19 carbon atoms and an aliphatic carboxylic acid ester having 1 to 18 carbon atoms.

Further, when a spacer is used, examples thereof are a polymethylene chain (—(CH$_2$)m—) and a polyoxyethylene chain (—(OCH$_2$CH$_2$)n—).

Alternatively, they may be those obtained by replacing a part of the methylene hydrogens of the spacer with an alkyl group, or an alkoxy group for branching.

The number of repetition of the structural unit constituting the spacer portion may appropriately be selected depending on the type of the main chain and the mesoginic unit. However, it is desirable to be generally 1 to 20, preferably 2 to 12, for the polymethylene chain (represented by "m" in the above formula) and to be generally 1 to 10, and preferably 1 to 3, for the polyoxyethylene chain (represented by "n" in the above formula).

The bonding group between the spacer and the main chain or mesogen depends upon the structure of the main chain, the type of the spacer to be used and the structure of the mesogen. The bonding form may sometimes be restricted to a certain degree according to the type of the main chain. However, examples of the bonding form generally include an ether linkage, an ester linkage, a linkage via an amide group or an imino group and a direct bond such as carbon to carbon bond. Among these, an appropriate one is selected.

Furthermore, for the type or the bonding group of the spacer, it may be employed singly. Alternatively, even the spacer using two or more bonding groups or linkage forms in combination can also preferably be used in the present invention.

Particularly preferred polymethacrylate and polyacrylate among the side chain type polymeric crystal is represented by the following formulae but is not restricted to these compounds:

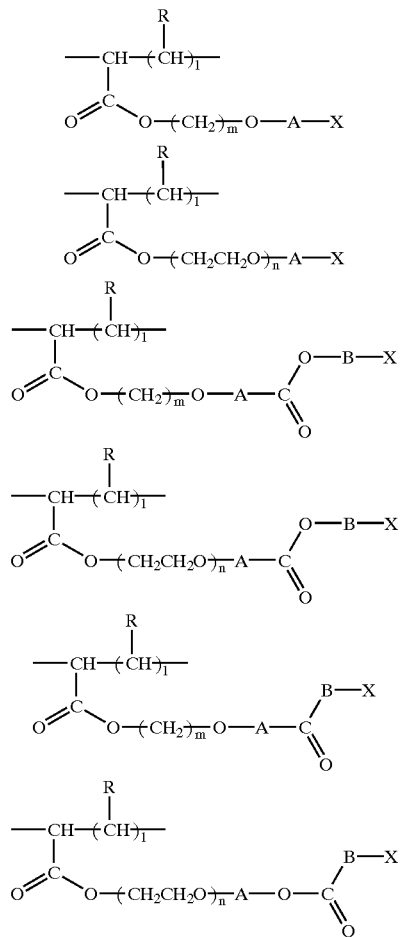

wherein R is hydrogen or a methyl group, l is an integer of 2 to 10,000, m is an integer of 0 to 20, n is an integer of 0 to 10, A and B are each independently a cyclic site selected from the bi-substituted functional groups represented by the following formulae below and the terminal functional group X is a nitro group, a cyano group, an alkyl group having 1 to 18 carbon atoms, an alkoxy group having 1 to 18 carbon atoms, an alkylthio group having 1 to 18 carbon atoms, an alkoxycarbonyl group having 2 to 19 carbon atoms and an aliphatic carboxylic acid ester having 1 to 18 carbon atoms:

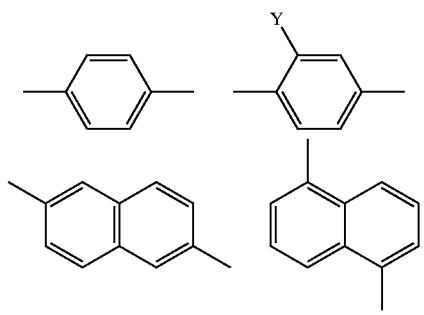

-continued

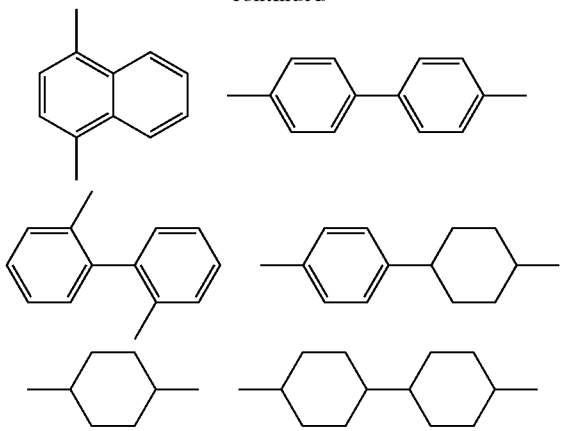

wherein Y is any of methyl, ethyl, n-propyl, iso-propyle, n-butyl, iso-butyl, tert-butyl, phenyl, methoxy, ethoxy, fluoro, chloro, bromo, iodo, acetoxy, methoxycarbonyl, cyano and nitro groups.

The number of the rings of the cyclic sites A and B is not limited. However, the case where (the number of the rings of A)+(the number of the rings of B)=3 is particularly preferred with the objective of the liquid crystallinity, alignment, cost and handling.

One example of such compounds satisfying the above requirements is represented by the following formula (1)

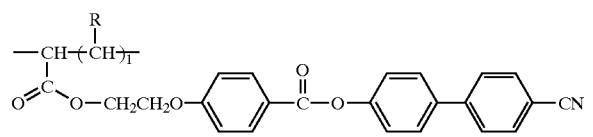

In the formula, "1" corresponding to the repeating unit is to be specified according to the balance with the molecular weight described below but is in the range of generally 2 to 10,000, preferably 3 to 5,000, more preferably 5 to 1,000 and most preferably 10 to 500.

The synthesis method of the side chain type liquid crystalline polymer described above is not particularly restricted. Examples of the synthesis method include:
(1) a method in which a spacer is reacted with the main chain and then a mesogen is bonded thereto;
(2) a method in which a mesogen to which a spacer is bonded is bonded to the main chain by introducing a mesogen through a functional group added to the main chain polymer by the esterification reaction using a phase transfer catalyst or by introducing a mesogen having a vinyl group through the Si—H linkage of polyoxymethylsilylene in the presence of platinum catalyst; and
(3) a monomer addition polymerization method of polymerizing by using a radical polymerization process, a monomer in which one or more polymerizable groups such as vinyl, allyl, vinyl ether, acylic and methacrylic groups have been introduced through a spacer into a mesogen.

Among these, the monomer addition polymerization method (3) is preferred in terms of the fact that a polymer having such a structure that a mesogen is bonded to the main chain can be obtained with reliability or in terms of the ease of the purification reaction.

Further, in the present invention, there may also be used the side chain type liquid crystalline polymer having a polymerizable functional group in the polymeric main chain, spacer or mesogen as a liquid crystalline polymer.

By using the side chain type liquid crystalline polymer having a polymerizable functional group, the crosslinking reaction can be conducted using the polymerizable functional group after performing an operation utilizing fluidity resulting from heating, such as for algnment thermal deformation or marking on the polymer surface by embossing, resulting in a liquid crystal film provided with thermal and mechanical stabilities.

Examples of the polymerizable functional group are vinyl-type polymerizable groups such as vinyl, aryl, vinyl ether, acrylic and methacrylic groups and maleic acid ester, azido, isocyanate, epoxy and methylol groups and an alkyl ether of a methylol group.

Alternatively, by introducing a functional group having an active hydrogen such as a hydroxy, carboxyl or mercapto group into the polymeric main chain and separately adding a substance having a reactive group thereto such as an isocyanate group, the crosslinking can be conducted after performing the operation utilizing fluidity resulting from heating.

Such a functional group having an active hydrogen is also included as the polymerizable group in the present invention.

Since no particular limitation is imposed on the method for synthesizing the side chain type liquid crystalline polymers having the polymerizable functional groups, it can be accomplished using any known method in the art.

Examples of the main chain type/side chain type liquid crystalline polymers exhibiting a cholesteric liquid crystal phase eligible for the present invention may be those obtained by introducing an optically active group into the main chain, spacer or mesogen of the above-described main chain type/side chain type liquid crystalline polymers exhibiting various nematic liquid crystal phase. The cholesteric liquid crystal phase referred to in the present invention may be shown by the liquid crystal material as a whole and the main chain type/side chain type liquid crystalline polymer is not required to exhibit a cholesteric liquid crystal phase. For example, any liquid crystal materials are eligible as long as they are capable of forming a desired cholesteric alignment resulting from the presence of the main chain type/side chain type liquid crystalline polymers exhibiting a nematic liquid crystal phase and various compounds having optically active groups in the liquid crystal material.

Such compounds having optically active groups may be of low molecular weights or high molecular weights and of liquid crystallinity or non-liquid crystallinity as long as they are capable of forming a desired cholesteric alignment without impairing the effect obtained by the present invention.

Examples of the optically active groups are the following monofunctional and polyfunctional units:

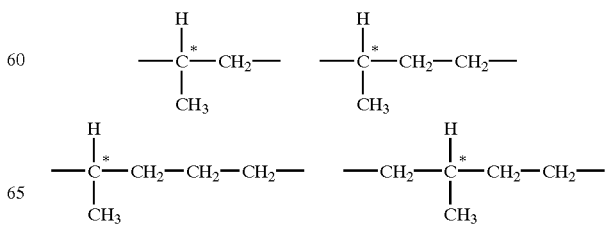

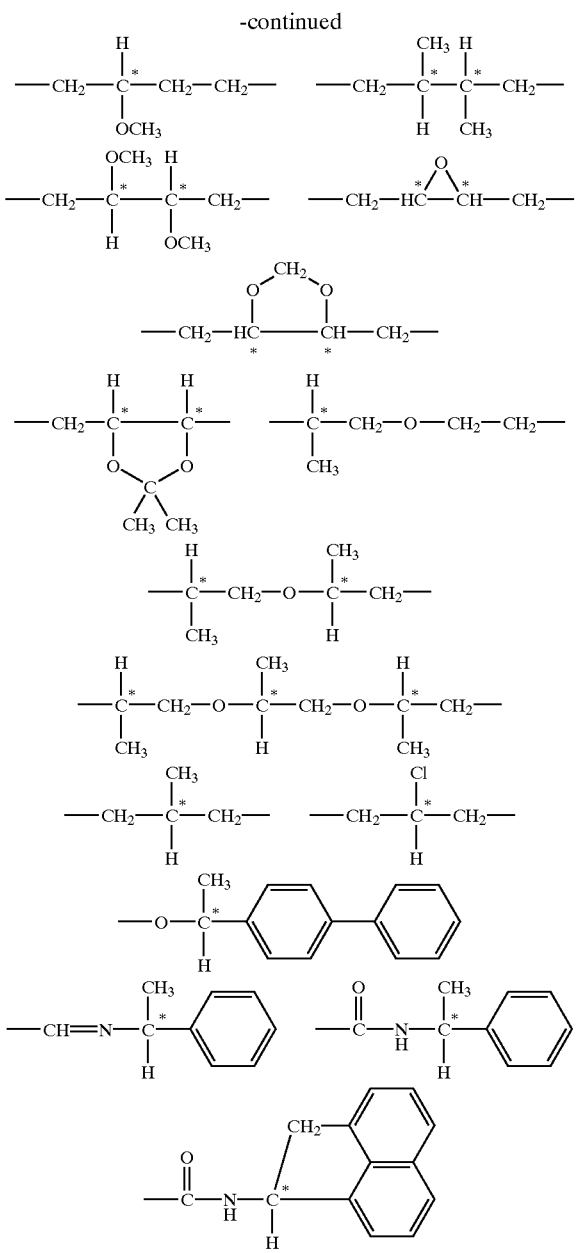

wherein ★ denotes an optically active carbon atom.

In the present invention, various compounds having the structural units as shown above can be added in such a range as not to impair the effect of the present invention. Alternatively, by using a compound having the above structural unit as the material monomer for the main chain type/side chain type liquid crystalline polymers, it is also possible to obtain various liquid crystalline polymers exhibiting a cholesteric liquid crystal phase in which an optically active group is introduced into the main chain or side chain.

The introducing ratio of the optically active groups differs depending on the type and the introduction site of the optically active group, the type such as composition ratio and the structure of the liquid crystalline polymer. However, it is in the range of generally 0.0001 to 0.05 mol/g, preferably 0.0002 to 0.02 mol/g and more preferably 0.0005 to 0.1 mol/g in terms of the molar value of the optically active group included per unit weight of the liquid crystalline polymer constituting the liquid crystal material. When it is less than 0.0001 mol/g, a sufficient twist can not often be induced. Whereas when it exceeds 0.05 mol/g, large amounts of the optically active compound are required as a starting material and such an amount exceeding 0.05 mol/g is not preferred with the objective of the availability of the material and the cost thereof.

The molecular weight of the above-described main chain type/side chain type liquid crystalline polymer differs depending on the type of synthesis method for the monomer, the optical characteristics and reliability of the final product and the process conditions. However, desirably, it is generally 300 or more, preferably 500 or more and more preferably 1,000 or more. The intrinsic viscosity in a phenol/tetrachloroethane (6/4 weight ratio) solvent at 30° C. is desirably in the range of generally 0.01 to 1.0 dl/g and preferably 0.05 to 0.5 dl/g. Each glass transition point temperature (Tg) of the liquid crystalline polymers is desirably higher than or equal to room temperature. In the present invention, it is desirably in the range of generally room temperature to 250° C., preferably 40 to 200° C. and more preferably 50 to 150° C.

The crosslinkable substance used in the present invention denotes a substance having such a property as to enable the liquid crystalline polymer to crosslink three-dimensionally by the linkage with the liquid crystalline polymer through the crosslinkable group and/or the self-condensation of itself by heat and/or light.

In the present invention, when the liquid crystalline polymer molecules included in the liquid crystal material are aligned in cholesteric alignment, the crosslinking reaction is required to proceed simultaneously with or after the alignment formation. Therefore, the selection of the crosslinkable substance becomes more important because the alignment formation temperature range differs depending on the types and composition of the above-described various liquid crystalline polymers. Furthermore, since the reaction starting temperature is a value inherent in the crosslinkable substance, it is required to be appropriately selected depending on the liquid crystalline polymer constituting the liquid crystal material. The reaction starting temperature of the crosslinkable substance to be used in the present invention depends upon the balance with the glass transition temperature of the above-described liquid crystalline polymer. However, it is desirable to be in the range of generally 40 to 240° C., preferably 60 to 220° C., more preferably 80 to 200° C. and most preferably 100 to 180° C. When it is less than 40° C., the crosslinking reaction may occur prior to the cholesteric alignment formation. As a result, there is a possibility that sufficient alignment order can not be obtained. Furthermore, there is another possibility that the conservation stability, i.e., pot life as the liquid crystal material is remarkably reduced. Whereas when it exceeds 240° C., a large quantity of heat is required for obtaining the temperature condition necessary for the crosslinking reaction, resulting in inefficient in terms of the process.

Examples of the crosslinkable substance capable of satisfying the foregoing reactivity, reaction starting temperature, and compatibility with the liquid crystalline polymer are (metha) acrylic compounds, urea compounds, melamine compounds, benzoguamine compounds, azido compounds, aziridinyl compounds and blocked isocyanate compounds. Among these compounds, preferred for the present invention are those having triazine rings such as melamine compounds, benzoguanamine compounds and various derivatives thereof, more specifically such as methylol group-containing compounds obtained by adding formaldehyde to these compounds and alkyletherified methylol group-containing compounds obtained by alkylating methylol groups. Particularly preferred are the benzoguamine compounds and derivatives thereof. Particularly preferred methylol group-containing compounds are those in which formaldehyde is added in an amount of generally 20 to 100%, preferably 25 to 95%, and more preferably 30 to 90% based on the amount of two amino groups present in the melamine compound or benzoguamine compound. Particualrly preferred alkyletherified methylol group-containing compounds are those in which the methylol group is alkylated in an amount of generally 20 to 99%, preferably 30 to 90% and more preferably 40 to 80% based on the total amount of the methylol group. It is noted that two or more alkyl groups may properly be present in the molecule at the same time in the alkyletherified methylol group. Examples of the alkyl group are methyl, ethyl, n-propyl, isopropyl, n-butyl, isobutyl, n-pentyl, isomyl, n-hexyl and 2-ethylhexyl groups.

In the present invention, commercially available melamine compounds and benzoguamine compounds can also be used. Examples of such commercially available compounds are methylated melamine derivatives such as M-100, M-100C, M-56, M-40S, M-50W, M-40W, M-30W and MC-1 and mixed etherified melamine derivatives such as M-66B, M-65B and M-22 manufactured by Sumitomo Chemical Co., Ltd.; and methylated melamine derivatives such as MS-11, MS-21, MW-22, MW-30, MW-30M, MW-24X, MS-001, MX-002, MX-730, MX-750, MX-708, MX-706, MX-042 and MX-035, mixed etherified melamine derivatives such as MX-45, MX-410 and MX-302 and benzoguamine derivatives such as BX-4000, BX-55H, BX-37, SB-401, SB-355, SB-303, SB-301, SB-255, SB-203, SB-201 and BL-60 manufactured by Sanwa Chemical Co., Ltd.

The proportion of the crosslinkable substances in the liquid crystal material depends on the type and composition of the liquid crystalline polymer and the type and molecular structure of the crosslinkable substance. However, it is in the range of generally 0.05 to 60 parts by weight, preferably 0.1 to 40 parts by weight, more preferably 0.2 to 20 parts by weight and most preferably 0.5 to 10 parts by weight per 100 parts by weight of the liquid crystalline polymer. When it is less than 0.05 parts by weight, sufficient crosslinking effect may not be obtained. Whereas when it exceeds 60 parts by weight, the inhibition or breakage of the cholesteric alignment may occur. Furthermore, the liquid crystallinity of the liquid crystalline polymer may be impaired. As a result, there is a possibility that the liquid crystal material can not form the cholesteric alignment.

The liquid crystal material of the present invention includes the foregoing liquid crystalline polymer and the crosslinkable substance, and if required, a compound having an optically active group. In the present invention, it is also possible to further mix various additives such as a photopolymerization initiator, a sensitizer, a dichroic dye, a dye, a pigment, an ultraviolet absorber, a hard coat agent and an antioxidant in such a range that the alignment inhibition or breakage of the cholesteric alignment formed by the liquid crystal material may not occur and the effect achieved by the present invention may not be hindered.

Any suitable methods can be employed for forming a film using the liquid crystal material of the present invention. For example, there can be employed a method in which the liquid crystal material in a molten or solution state is developed on one supporting film or a method in which it is interposed between two supporting films. However, in the present invention, there is a high risk that low molecular weight and low boiling compounds such as alcohol, water and aldehyde are by-produced from the liquid crystal material during the alignment formation and/or crosslinking reaction. For example, when the liquid crystal material is subjected to a heat treatment required for the crosslinking reaction while being interposed between the two supporting films, there may occur the defects such as bubbling in the film due to such by-products. Therefore, when the heat treatment for the crosslinking is carried out, either one interface of the liquid crystal material film is desirably an air interface. Whereas when the alignment formation described below is carried out using two supporting films, it can be said that either one supporting film is desirably removed when the heat treatment required for the crosslinking reaction is conducted.

A detailed description will be given to the preferred method for manufacturing a liquid crystal film from the liquid crystal material used in the present invention, specifically the following method. Namely, the liquid crystal material is dissolved in a solvent and the resulting solution is applied onto a supporting film or substrate, after which the coat layer is dried to vaporize the solvent. Subsequently, the dried film is subjected to a heat treatment to form the cholesteric alignment and the crosslinking reaction is effected simultaneously with or after the alignment formation, thereby forming a liquid crystal film.

Solvent for Preparing a Solution

Examples of the solvent for dissolving or dispersing the liquid crystal material used in the present invention are hydrocarbons such as benzene, toluene, xylene, n-butylbenzene, diethylbenzene and tetralin; ethers such as methoxybenzene, 1,2-dimethoxybenzene and diethylene glycol dimethyl ether; ketones such as acetone, methyl ethyl ketone, methyl isobutyl ketone, cyclohexane and 2,4-pentadione; esters such as ethyl acetate, ethylene glycol monomethyl ether acetate, propylene glycol monomethyl ether acetate, propylene glycol monoethyl ether acetate and γ-butyrolactone; amidic-based solvents such as 2-pyrrolidone, N-methyl-2-pyrrolidone, dimethylformamide and dimethylacetoamide; halogenous-based solvents such as chloroform, dichloromethane, carbon tetrachloride, dichloroethane, tetrachloroethane, trichloroethylene, tetrachloroethylene, chlorobenzene and ortho-dichlorobenzene; alcohols such as tert-butyl alcohol, diacetone alcohol, glycerin, monoacetin, ethylene glycol, triethylene glycol, hexylene glycol, ethylene glycol monomethyl ether, ethyl cellosolve and butyl cellosolve; and phenols such as phenol and para-chlorophenol. These can be used alone or in combination of two or more thereof.

Even when the solubility of the liquid crystal material is insufficient or the supporting film described below may be eroded only by the use of a single solvent, the deficiency can be avoided by using a mixture of two or more solvents.

Among the solvents exemplified above, preferred single solvents are the hydrocarbon-based solvents and the glycol monoether acetate-based solvents, while preferred mixed type solvents are solvents of ethers or ketones and glycols.

The concentration of the solution depends on the solubility of the liquid crystal material and the thickness of the film to be manufactured. However, it is adjusted in the range of generally 1 to 60% by weight and preferably 3 to 40% by weight.

A surfactant can be added to the solution of the liquid crystal material for facilitating the coating. Eligible surfactants are cationic surfactants such as imidazoline, quarternary ammonium salt, alkylamide oxide and polyamine derivatives; anionic surfactants such as polyoxyethylene-polyoxypropylene condensation product, primary or secondary alcohol ethoxylate, alkylphenol ethoxylate, polyethylene glycol and esters thereof, sodium lauryl sulfate, ammonium lauryl sulfate, amine lauryl sulfate, alkyl-substituted aromatic sulfonate, alkylphosphate and a condensation product of aliphatic or aromatic sulfonic acid and formaline; amphoteric surfactants such as laurylamide propylbetamine and laurylamino betaine acetate; nonionic surfactants such as polyethylene glycol fatty acid esters and polyoxylene alkylamine; and fluorine-containing surfactants such as perfluoroalkyl sulfonate, perfluoroalkyl carboxylate, perfluoroalkyl trimethylammonium salts, perfluoioalkyl group-and hydrophillic group-containing oligomers, perfluoroalkyl group- and hydrophobic group-containing oligomers and perfluoroalkyl group-containing urethanes.

The amount of the surfactant to be added depends on the type of the surfactant to be used, the type of the liquid crystal material, the type of the solvent and the type of the supporting film to be coated with the solution. However, it is in the range of generally 10 ppm by weight to 10% by weight, preferably 100 ppm by weight to 5% by weight and more preferably 0.1 to 1% by weight based on the amount of the liquid crystal material included in the solution.

Supporting Film and Supporting Substance and Imparting Alignment Capability Thereto The solution of the liquid crystal material is applied onto a supporting film or substrate. Eligible supporting films are plastic films of polyimide, polyamide-imide, polyamide, polyether imide, polyether ether ketone, polyether ketone, polyketone sulfide, polyether sulfone, polysulfone, polyphenylene sulfide, polyphenylene oxide polyethylene terephthalate, polybutyrene terephthalate, polyethylene naphthalate, polyacetal, polycarbonate, polyarylate, acrylic resin, polyvinyl alcohol, polypropylene, cellulose, triacetyl cellulose and partially saponified product thereof, epoxy resins and phenol resins. These plastic films may properly be laminated films each composed of two or more films stacked one on another. Alternatively, they may propoerly be uniaxially oriented or biaxially oriented films. Furhtermore, the supporting film may be previously subjected to a surface treatment such as a hydrophilization treatment or hydrophobilization treatment.

Depending upon the composition of the liquid crystal material included in the solution, it is not required to additionally impart the alignment capability to the supporting film. However, in the present invention, it is desirably to impart the alignment capability to the supporting film prior to the coating of the solution. The alignment capability to the supporting film can be imparted by stacking an alignment layer on the supporting layer or subjecting the supporting film or the alignment layer stacked thereon to a rubbing treatment. Alternatively, the alignment capability can be imparted to the supporting film by obliquely depositing silicone dioxide thereon. Eligible films are those formed from polyimide, polyamide or polyvinyl alcohol. The rubbing treatment is generally accomplished by the following method. Namely, a rubbing cloth selected from the materials such as rayon, cotton and polyamide is wrapped around a metal roll. The roll is rotated while being in contact with the film or the film is transferred with roll fixed, thereby rubbing the film surface or the alignment layer surface with the rubbing cloth.

In place of the supporting film described above, there can be also used supporting substrates such as a metal substrate made of aluminum, iron and copper, provided with slit-like grooves on the surface or a glass substrate made of alkaline glass, borosilicate glass or flint glass, whose surface has been etched into a slit form. Alternatively, if required, the diffraction element substrate described below can also be used as the supporting film or supporting substrate.

Coating and Drying of the Solution

The solution can arbitrarily be coated onto the supporting film or supporting substrate by various coating methods such as a spin coating method, a roll coating method, a printing method, a dip coating method and a curtain coating method (die coating method). By using any given method selected from these various coating method, the solution is applied onto a supporting film or substrate to form a coat layer. The coat layer thus formed is then dried to vaporize the solvent in the coat layer. The coat layer can be dried by various drying methods such as air drying at room temperature, drying on a hot plate or in a drying oven and warm- or hot-air spraying. The drying may be accomplished to such an extent that the coat layer is not fluidized or flown off.

Depending upon the composition of the liquid crystal material contained in the coat layer, the cholesteiic alignment formation may sometimes be completed in a thermotropic manner at a temperature at which the solvent is removed or in a lyotropic manner in the process where the solvent is removed. Therefore, there may be a case where no more alignment layer treatment is required. However, the dried coat layer is required to undergo a heat treatment after the drying process in order to render the alignment of the liquid crystal more complete and to effect the crosslinking reaction.

In the present invention, when the alignment formation is performed by a heat treatment, this heat treatment and that for the crosslinking reaction can also be carried out separately in their mutually different heat treatment atmospheres. Alternatively, they can also be carried out in one heat treatment atmosphere, for example, in one heat treatment furnace at the same time.

The alignment formation of the dried coat layer can be accomplished by using a method in which the liquid crystal material forming the coat layer is heated up to a temperature higher than or equal to the liquid crystal transition point so as to be in a liquid crystal state and this state is maintained for a prescribed period of time and a method in which the composition is heated to a temperature higher than the liquid crystal transition point so as to be in an isotropic liquid state and then shifted into a liquid crystal state by decreasing the temperature and this state is maintained for a prescribed period of time.

The heat treatment temperatures required for the alignment formation of the dried coat layer and for the crosslinking reaction depends upon the type and composition of the liquid crystalline polymer and the reaction starting temperature of the crosslinkable substance. However, they are in the range of generally 30° C. to 220° C., preferably 50° C. to 180° C. and more preferably 60° C. to 160° C. It is desirably to select such liquid crystalline polymer and crosslinking substance that the crosslinking reaction proceeds simultaneously with or after the alignment formation within the this temperature range. When the reaction starting temperature of the crosslinkable substance is higher than the aforesaid range, a heat treatment thereof is required to be conducted in the temperature range necessary for the crosslinking reaction after the alignment formation. The heat treatment time depends upon the heat treatment temperature, the types of the liquid crystalline polymer and crosslinkable substance contained in the coat layer. However, the heat treatment time required for both the alignment formation and the crosslinking reaction is generally 5 seconds to 2 hours, preferably 10 seconds to 40 minutes and more preferably 20 seconds to 20 minutes. A heat treatment for less than 5 seconds may cause insufficient alignment formation and crosslinking reaction. Whereas a heat treatment for over 2 hours would result in extremely low productivity. The heat treatment for the crosslinking reaction can be carried out by rising the heat treatment temperature at several stages or carried out in several separate steps. For example, when the diffraction capability described below is imparted to the liquid crystal film, the crosslinking may proceed too much level, resulting in a difficulty in transferring the diffraction pattern. In such a case, the crosslinking may be stopped to an appropriate level so as to conduct another heat treatment required for the crosslinking reaction after imparting the diffraction capability.

After the heat treatment, cooling is preferably conducted, if required. For example, when the heat treatments for the alignment formation and the crosslinking reaction are conducted at the same time, cooling is not required because the cholesteric alignment can be fixed by the crosslinking reaction. However, in the case where the crosslinking reaction is conducted in, for example, another heat treatment furnace after once forming the cholesteric alignment, it is preferred in the present invention that the cholesteric alignment is fixed by a cooling operation after forming the alignment. No particular limitation is imposed on the cooling treatment. It may be conducted, for example, by transferring the film from the heat treatment atmosphere required for the alignment formation to the room temperature condition and allowing it to cool. Alternatively, if required, the cooling treatment may also be conducted by using forced cooling means such as water-cooling.

When a substance acting by light is used as the crosslinkable substance, the cholesteric alignment is fixed by light irradiation. The light for the light irradiation crosslinking can be selected from known means such as electron beams and various active light rays. Specifically, electron beams, ultraviolet rays, visible rays or infrared rays (heat rays) can be used according to the situation. In general, ultraviolet rays or visible rays are used and the irradiation light with a wavelength of 150 to 700 nm, preferably 250 to 650 nm and more preferably 300 to 500 nm are used. Examples of the light source for the irradiation light are low-mercury lamps such as germicidal lamps, fluorescent chemical lamps and black light, high-pressure discharge lamps such as high-pressure mercury lamps and metal halide lamps and short arc discharge lamps such as super high-pressure mercury lamps, xenon lamps and mercury xenon lamps. Among these, preferred are the metal halide lamps, xenon lamps and high-pressure mercury lamps. For light irradiation, a filter can be disposed between the light source and an object to be irradiated, i.e., liquid crystal material coat layer to expose the object to a light ray within a prescribed wavelength region.

Although the irradiation dose is adjusted according to the composition of the liquid crystal material forming the coat layer or the presence or absence or the amount of an initiator, it is in the range of generally 2 to 5,000 mJ/cm$^2$, preferably 10 to 3,000 mJ/cm$^2$ and more preferably 100 to 2,000 mJ/cm$^2$.

Although the atmospheric temperature at which the light irradiation is conducted is appropriately selected according to the physical and chemical properties of the coat layer, it is in the range of generally 0 to 200° C., preferably 20 to 180° C. and more preferably 25 to 160° C. However, in the case where the liquid crystal material having a high order phase such as a smetic phase of a crystal phase at a low-temperature range around room temperature and having a chiral nematic phase in a temperature range higher than the low-temperature range is fixed in a chiral nematic phase state by photo-crosslinking, the light irradiation should sometimes be conducted at a temperature higher than or equal to the phase transition point of high order phase-chiral nematic phase. Whereas when the nematic phase has been already fixed by supercooling in the heat treatment process preceding the photo-crosslinkng, the light irradiation may properly be conducted after reheating the coat layer so as to impart the fluidity thereto because of the low crosslinking rate of the liquid crystal layer. The light irradiation may also be repeated plural times. For example, the reaction rate of the photoreaction can be further improved by conducting the light irradiation under heating once to crosslink the coat layer to a certain degree and conducting another light irradiation after cooling. Furthermore, there may also be conducted a so-called aging in which another heat treatment is conducted after the light irradiation to bring the unreacted site to a further reaction.

No particular limitation is imposed on the atmosphere where the light irradiation is conducted. However, when the coat layer is susceptible to the reaction inhibition due to the oxygen or ozone in the atmosphere or when the coat layer and/or the supporting film thereof may be colored under the influence of the oxygen or ozone in the atmosphere, the irradiation atmosphere is preferably an inactive gas atmosphere such as a nitrogen gas atmosphere. The light irradiation can also be conducted by covering the coat layer surface with a film having an oxygen or ozone blocking ability in place of adopting the inactive gas atmosphere as long as the alignment of the liquid crystalline molecules in the coat layer is not inhibited. Examples of such a blocking film are polyethylene terephthalate film, polyethylene naphthalate film, polyphenylene sulfide film, polyarylate film, polycarbonate film, polyvinyl alcoholic film, polyvinyl acetate film, polyethylene film, polypropylene film, polyvinyl chloride film, polyvinylidene chloride film, polyamide film, polyimide film and polyethylene-vinyl acetate coextrusion film.

A liquid crystal film in which the cholesteric alignment has been fixed can be obtained by the foregoing method. No particular limitation is imposed on the actual thickness of the resulting liquid crystal film, i.e., the layer made of the liquid crystal material. However, it is desirably in the range of generally 0.3 to 20 $\mu$m, preferably 0.5 to 10 $\mu$m and more preferably 0.6 to 6 $\mu$m in terms of the manufacturability and the manufacturing process. An actual thickness of less than 0.3 $\mu$m would cause a reduction in the selective reflection effect obtained by the cholesteric alignment. The wavelength bandwidth of the cholesteric selective reflection is appropriately adjusted according to the use thereof. However, it is desirably in the range of generally 15 to 150 nm and preferably 30 to 120 nm. Whereas the center wavelength of the cholesteric selective reflection is desirably in the range of generally 380 to 780 nm and preferably 420 to 700 nm of the visible region or the range of 800 to 2,000 nm and preferably 850 to 1,100 nm of the near-infrared region. The wavelength bandwidth of the selective reflection used herein denotes a wavelength range providing a reflectance of 70% or more due to selective reflection when a circularly polarized light in the same direction as the twist direction of the liquid crystal molecules forming the cholesteric alignment is made incident upon the liquid crystal film. When the wavelength bandwidth departs from the aforesaid range, the liquid crystal film itself is vivid-colored but the reflected light is dark or the contrary thereto may happen. Furthermore, the visibility might be degraded according to the use. The number of turns of twist in the cholesteric alignment is generally from 2 to 10 and preferably from 2 to 6. When it is less than two turns, a sufficient selective reflection effect caused by the cholesteric alignment may not be obtained. Whereas when it exceed 10 turns, the diffraction capability described below may not be imparted to the liquid crystal film or may be less effective even if it can be imparted to the film.

A detail description will be given to the procedure in which to provide a region exhibiting a diffraction capability on at least a part of the resulting liquid crystal film with fixed cholesteric alignment.

Imparting Diffraction Capability

No particular limitation is imposed on the method for imparting the diffraction capability to the liquid crystal film as long as it can impart a region exhibiting a diffraction capability to a part of the liquid crystal film. However, a method is generally employed in which method a diffraction pattern is transferred onto the liquid crystal film substrate using a diffraction element substrate.

The materials for the diffraction element substrate for use in transferring the diffraction pattern onto the liquid crystal film may also be those such as metals and resins. Alternatively, any materials such as those obtained by imparting a diffraction function to the film surface and those obtained by transferring a thin film having a diffraction function onto the film are eligible as long as they have the diffraction function. Especially, the film or film laminate having a diffraction function is more desirably in term of the ease of handling thereof and the mass productivity thereof.

The diffraction element used herein encompasses all diffraction elements generating diffracted light, such as a plate of a plane hologram. It may be of the type of a diffraction element derived from the surface profile, a so-called film thickness modulation hologram or of the type of a phase element which is not based on the surface profile or whose surface profile is converted into a refractive index profile, a so-called refractive index modulation hologram. In the present invention, the film thickness modulation hologram type is preferably used from the viewpoint of being capable of imparting the diffraction pattern information to the liquid crystal more easily. The refractive index modulation type can be preferably used in the present invention as long as it has undulations for generating a diffraction in the surface profile.

The conditions under which the diffraction pattern is transferred to the liquid crystal film differ depending upon the properties of the liquid crystal film and materials for the diffraction element substrate. However, the transfer can be carried out under the heating and/or pressurizing conditions of generally a temperature of 40 to 300° C. and preferably 70 to 80° C. and a pressure of 0.05 to 80 MPa and preferably 0.1 to 20 MPa. The temperature of less than 40° C. would cause an insufficient diffraction pattern transfer in a liquid crystal film having a sufficiently stable alignment state at room temperature. A temperature exceeding 300° C. would result in the dissociation or degradation of the liquid crystal film. A pressure of less than 0.05 MPa would cause insufficient diffraction pattern transfer. A pressure exceeding 80 MPa, would cause the breakage of the liquid crystal film or other base material.

The time length required for the transfer differs depending on the type of the liquid crystal material forming the liquid crystal film, the crosslinking state, the film form, the diffraction pattern type and the material of the diffraction element substrate. However, it is generally 0.01 second or more and preferably 0.05 second to one minute. The processing time shorter than 0.01 would cause an insufficient diffraction pattern transfer. The processing time exceeding one minute is not preferred from the view point of the productivity.

The diffraction pattern can be transferred onto the liquid crystal film in the following manner in which by using a generally used compression molding apparatus satisfying the foregoing conditions, rolling machine, calendar roller, heat roller, laminator, hot stump, electrothermal plate or thermal head, the diffraction elemept substrate and the liquid crystal film are installed in the molding apparatus in such a state that the liquid crystal surface of the liquid crystal film is in contact with the diffraction pattern surface. Thus, the diffraction pattern of the diffraction element substrate can be transferred onto the liquid crystal film. The transfer of the diffraction pattern is not limited to be made on one surface of the liquid crystal film and thus the diffraction pattern can also be transferred on both surfaces of the liquid crystal film in the same manner.

After completing the transfer of the diffraction pattern of the diffraction element substrate onto the liquid crystal film by any of the foregoing methods under the foregoing conditions, the diffraction element substrate is peeled off and removed from the liquid crystal film.

The liquid crystal film from which the diffraction element substrate has been removed has a region exhibiting a diffraction capability on its film surface on which the diffraction pattern has been transferred. The term "region exhibiting a diffraction capability" used herein denotes a region generating such an effect that the light passing the region or the light reflected from the region is diffracted into the geometrical shadow portion of an obstacle. The presence or absence of the region exhibiting a diffraction capability can be confirmed by checking whether there is present or not present the light emitted at a certain angle, i.e., high-order light other than the light transmitted therethrough or reflected therefrom, i.e., zero-order light when, for example, laser light or the like is made of incident upon the region. Alternatively, it is also possible to confirm whether the region exhibiting a diffraction capability is formed or not by observing the surface profile and the cross-sectional profile of the liquid crystal layer with an atomic force microscope or a transmission electron microscope. The region exhibiting a diffraction capability can also be formed in a plurality of regions of the liquid crystal film, for example, on the front and back surfaces of the film, respectively. The region exhibiting a diffraction capability is not necessarily required to be formed in a layer having a uniform thickness on the film side surface. The resulting film can its effect as a polarization diffraction film as long as the region is formed on at least a part of the film side surface. The region exhibiting a diffraction capability can also be formed in the shape of a desired diagram, pitograph or numerical number. When the film has a plurality of regions each exhibiting a diffraction capability, all the regions are not required to exhibit the mutually same diffraction capability and such a film is also acceptable that respective regions exhibit mutually different diffraction capabilities.

On the other hand, when the region exhibiting a diffraction capability is formed into a layer, the thickness thereof is generally 50% or less, preferably 30% or less and more preferably 10% or less based on the thickness of the liquid crystal film. A layer thickness exceeding 50% would cause an reduction in the effects such as the selective reflection characteristics and circularly polarization characteristics, resulting from the cholesteric liquid crystal phase. Consequently, the film fails to obtain the polarization diffraction effect.

The surface of the film on which the diffraction pattern has been transferred, that is, on the region exhibiting a diffraction capability assumes a cholesteric alignment in which the helical axes are not homogeneously parallel with each other and preferably assumes that in which the helical axes are not homogeneously parallel with each other in the direction of the thickness and the helical pitch lengths are not homogeneously equal in the direction of the thickness. The regions other than this region have desirably the same alignment as the conventional alignment, that is, the helical structure in which the helical axes are homogeneously parallel with each other in the direction of the thickness and the helical pitch lengths are homogeneously equal in the direction of the thickness.

In the case where the region exhibiting a diffraction capability is formed on either one surface region of the film, the front and back surfaces thereof, that is, the film surface having a region exhibiting diffraction capability and the opposite surface thereof exhibit somewhat different optical effects and coloration effect. Therefore, it is desirable to appropriately select the configuration of the surfaces of the liquid crystal film according to the use thereof, the objective function and the like.

In the foregoing manner, a polarization diffraction film of the present invention is obtained. If required, the transfer or attaching to another substrate hereinafter referred to as "a second substrate", and treatments for improving various resistances can be conducted.

The transfer or attaching to the second substrate is conducted when the supporting film or substrate hereinafter referred to as "an alignment supporting substrate" used in manufacturing of the polarization diffraction film has such an optical performance as to impair the effect of the present invention, for example, when it has an absorption in the wavelength region used. In general, the resulting polarization diffraction film can be transferred with a pressure sensitive adhesive or an adhesive onto the second substrate.

No particular limitation is imposed on the second substrate to be used for transfer as long as it assumes a sheet-, film or plate-like shape. Examples of the materials for the second substrate are sheets, films or substrates of polyimide, polyamideimide, polyamide, polyether imide, polyether ether ketone, polyether ketone, polyketone sulfide, polyether sulfone, polysulfone, polyphenylene sulfide, polyphenylene oxide, polyvinyl chloride, polystyrene, polypropylene, polymethyl methacrylate, polyethylene terphthalate, polybutyrene terphthalate, polyethylene naphthalate, polycarbonate, polyvinyl alcohol, polyacetal, polyarylate, cellulosic plastics, epoxy resins or phenol resins, or papers such as paper and synthetic paper or glass plates. They may also be the substrates each provided with irregularities on its surface.

No particular limitation is imposed on the pressure sensitive adhesive or adhesive for use in transfer. There may appropriately be used conventionally known various adhesives such as photo- or electron beam-setting reactive adhesives and hot melt type adhesives.

Eligible reactive adhesives are those obtained by blending, if required, other monofunctional, polyfunctional monomers, various polymers and stabilizers with prepolymers and/or monomers having a photo- or electron beam-polymerizability.

Specific examples of the prepolymer having photo- or election beam-polymerizability are polyester acrylate, polyester methacrylate, polyurethane acrylate, polyurethane methacrylate, epoxy acrylate, epoxy methacrylate, polyol acrylate and polyol methacrylate. Examples of the monomers having photo- or electron beam-polymerizability are monofunctional acrylate, monofunctional methacrylate, bifunctional acrylate, bifunctional methacrylate, tri- or more polyfunctional acrylate and polyfunctional methacrylate. Commercially available products of these prepolymers can also be used. For example, Aronix (acrylic speciality monomer, oligomer manufactured by Toagosei Co., Ltd.), Light Ester (manufactured by Osaka Chemical Co.) and Biscoat (manufactured by Osaka Organic Chemical Industry Ltd.) can be used.

Eligible photopolymerization initiators are benzophenone derivatives, acetonephenone derivatives, benzoin derivatives, thioxanthones, Micheler's ketone, benzyl derivatives, triazine derivatives, acylphosphine oxides and azo compounds.

The viscosity of the photo- or electron beam-setting reactive adhesive is appropriately selected according to the processing temperature thereof. However, it is in the range of generally 10 to 2,000 mPa·S, preferably 50 to 1,000 mPa·S and more preferably 100 to 500 mPa·S. A viscosity of less than 10 mPa·S would lead to a difficulty in obtaining a desired thickness. A viscosity exceeding 2,000 mPa·S would cause the undesirably reduced workability. When the viscosity departs from the aforesaid range, it is preferred that the proportion of the solvent and the monomer is appropriately adjusted to obtain a desired viscosity.

When the photo-setting reactive adhesive is used, it can be cured by using known curing means such as a low-pressure or high-pressure mercury lamp, a super high-pressure mercury lamp, a metal halide lamp or a xenon lamp. The irradiation dose differs according to the type of the reactive adhesive to be used. However, it is generally in the range of 50 to 2,000 mJ/cm$^2$ and preferably 100 to 1,000 mJ/cm$^2$.

When the electron beam-setting reactive adhesive is used, the curing method thereof is appropriately selected depending on the penetrating and curing powers of the electron beam. However, the adhesive can be cured by irradiation under the conditions where the accelerating voltage is 50 to 1,000 kV and preferably 100 to 500 kV.

When the hot-melt type adhesive is used, no particular limitation is imposed thereon. However, preferred are those with a working temperature of hot melt in the range of about 80 to 200° C. and preferably 100 to 160° C. from the viewpoint of the workability. Specific examples are those manufactured by using as base resins ethylene-vinyl acetate copolymer resins, polyester resins, polyurethane resins, polyamide resins, thermoplastic rubbers, polyacrylic resins, polyvinyl alcohol resins, polyvinyl acetal resins such as polyvinyl butyral, petroleum resins, terpene resins and rosin resins.

When a pressure sensitive adhesive is used as an adhesive, no particular limitation is imposed thereon. For example, there may be used rubber based-, acrylic-, silicone based- and polyvinyl ether based-pressure sensitive adhesives.

The thickness of these adhesives when applied differs according to the usage thereof and the workability. However, it is in the range of generally 0.5 to 50 $\mu$m and preferably 1 to 10 $\mu$m.

No particular limitation is imposed on the method for applying the above-described adhesives. They can be applied on the second substrate or the polarization diffraction film or alternatively both of them using known methods such as roll coating, die coating, bar coating, curtain coating, extrusion coating, gravure coating and spin coating methods.

There is no particular restriction on the method for laminating the polarization diffraction film of the present invention and the second substrate using the pressure sensitive adhesive or the adhesive. However, the lamination can be conducted by using the apparatus appropriately selected from those exemplified with regard to the means for transferring the diffraction pattern onto the liquid crystal film described above. Thus, there can be obtained a laminate comprised of, for example, the alignment supporting substrate, the liquid crystal film, the adhesive layer and the second substrate in this order.

There is no particular restriction on the method for removing the alignment supporting substrate from the liquid crystal film. However, a method may be employed in which the alignment supporting substrate is peeled and removed from the liquid crystal film or is dissolved. Examples of the peeling and removing method are a method in which an adhesive tape is stuck on the corner end portions of the alignment supporting substrate and then artificially peeled off therefrom; a method in which the substrate is mechanically peeled off using a roller; a method in which it is immersed in a poor solvent with respect to all the structural materials and then mechanically peeled off; a method it is peeled off by applying an ultraviolet wave thereto in a poor solvent; a method in which it is subjected to temperature change by utilizing a difference in thermal expansion coefficient between the alignment supporting substrate and the liquid crystal film thereby peeling off the substrate; and a method in which the alignment supporting substrate itself or the alignment film thereon is dissolved and removed. The peelability differs according to the physical properties of the liquid crystal material forming the liquid crystal material and the adhesiveness with the alignment supporting substrate. Therefore, the method most suitable for such conditions is employed.

In the present invention, a protective layer may be formed on the surface of the diffraction polarization film for the purposes of the protection, strength enhancement and environmental reliability improvement thereof. No particular limitation is imposed on the protective layer as long as it has ultraviolet absorption and/or hard coat characteristics. For example, it may be those obtained by forming the protective layer forming material containing an ultraviolet absorber and a hard coat agent into a film-, sheet-, thin film- or plate-like product. Alternatively, there may be used a laminate of a protective layer having ultraviolet absorption characteristics, composed of the protective layer forming material containing the ultraviolet absorber hereinafter referred to as "ultraviolet absorption layer" and a protective layer having hard coat characteristics, composed of the protective layer forming material containing the hard coat agent hereinafter referred to as "hard coat layer" as the protective layer for the present invention. Further alternatively, a laminate of a commercially available ultraviolet cut-off film and a hard coat film can also be used as the protective layer. Still further alternatively, a laminate formed into a film by coating various hard coat agents onto an ultraviolet absorption layer is also eligible. The ultraviolet layer and the hard coat layer may be independently formed in a two or more layered structure and respective layers can be laminated one on another through an adhesive layer.

The protective layer forming material has desirably a high light transmittance. Examples of the material are those obtained by adding the ultraviolet absorbers and/or hard coat agents to polyethylene, polypropylene, poly(4-methylpentene-1), polystyrene, ionomer, polyvinyl chloride, polymethyl methacrylate, polyethylene terephthalate, polyamide, polysulfone or cellulose based resins. As the protective layer, there may also be used an adhesive composition obtained by adding the ultraviolet absorber and/or hard coat agent to thermo-, photo- or electron beam-setting reactive adhesive. The cured product of the adhesive composition can also be used as the protective layer.

In addition to the ultraviolet absorber and the hard coat agent, if required, there may be mixed various additives including light stabilizers such as hindered amines and quenchers, antistatic agents, slip improvers, dyes, pigments, surfactants, fillers such as fine silica and zirconia. No particular limitation is imposed on the mixing ratio of these additives, as long as they are not such a range as to adversely affect the invention. However, they are in the range of generally 0.01 to 10% by weight and more preferably 0.05 to 5% by weight.

No particular limitation is imposed on the ultraviolet absorber as long as it is compatible with or dispersed in the protective layer forming material. Examples of the ultraviolet absorber are organic ultraviolet absorbers such as benzophenone compounds, salicylate compounds, benzotriazole compounds, anilide oxalate compounds and cyanoacrylate compounds and inorganic ultraviolet absorbers such as cesium oxide, titanium oxide and zinc oxide. Among them, the benzophenon compounds with a high ultraviolet absorption efficiency are preferably used. The ultraviolet absorber can be added singly or in combination. The mixing ratio of the ultraviolet absorber in the protective layer differs depending upon the type of the protective layer forming material to be used. However, it is in the range of generally 0.1 to 20% by weight and preferably 0.5 to 10% by weight.

No particular limitation is imposed on the hard coat agent as long as it is compatible with or dispersed in the protective layer forming material. Examples of the hard coat agent are organopolysiloxane based-, photosetting resin type acryl oligomer based-, urethane acrylate based- and thermosettinng resin type acyl-silicone based-hard coat agents and inorganic compounds such as ceramics. Among these, the organopolysiloxane based- and the photosetting type acryl oligomer based-hard coat agents are preferably used because of their film forming property. These hard coat agents may be of solventless type or of solvent type.

The ultraviolet absorption layer may be formed by adding an ultraviolet absorber and, if required, a light stabilizer to the foregoing protective layer forming material. Furthermore, commercially available ultraviolet cut-off films are also eligible for the present invention.

The hard coat layer may be formed by adding the hard coat agent and, if required, various additives to the foregoing protective layer forming material. Alternatively, the hard coat layer may also be those formed by applying the hard coat agent onto a transparent supporting film. Examples of the transparent supporting film are films formed from polymethyl methacrylate, polystyrene, polycarbonate, polyethylene sulfone, polyphenylene sulfide, amorphous polyolefin, triacetyl cellulose, polyethylene terephthalate and polyethylene naphthalte.

Vehicle resins for gravure ink are also eligible as the transparent supporting film. Examples of the vehicle resin for gravure ink are nitrocellulose, ethyl cellulose, polyamide resin, vinyl chloride, chlorinated polyolefin, acrylic resin, polyurethane and polyester. In order to improve the adhesion and the film strength, hard resins such as ester gum, dammar gum, maleic acid resin, alkyd resin, phenol resin, ketone resin, xylene resin, terpene resin and petroleum resin may be added to the vehicle resin for gravure ink.

The hard coat layer may be comprised of one hard coat layer or a composite layer according to the required weather resistance. The composite layer may be a composite layer made of two or more layers comprised of the combination of a hard coat layer containing organopolysiloxane, a hard coat layer containing photosetting resin, a hard coat layer containing thermosetting resin or a hard coat layer containing an inorganic compound.

The degree of the hard coatability, i.e., the hardness depends upon the materials forming the polarization diffraction film. However, when an evaluation is carried out in accordance with the testing method described in JIS L 0849, the result thereof is desirably at least 3 or more and preferably 4 or more as the evaluation criteria for discoloration.

The ultraviolet absorption layer and the hard coat layer can be laminated one on another with an adhesive to form the protective layer used in the present invention. Eligible adhesives are thermo-, photo- or electron beam-setting adhesives. Alternatively, the protective layer can be formed by laminating the separately prepared hard coat layer on the polarization diffraction film using an adhesive containing an ultraviolet absorber. If required, dyes, pigments and surfactants may also be appropriately added to the adhesive.

The protective layer and the ultraviolet absorption layer and hard coat layer forming the protective layer may be formed on the polarization diffraction film by known methods such as roll coating, dipping, gravure coating, bar coating, spin coating, spray coating and printing methods. After a film is formed on the liquid crystal film or the supporting film by any one of these film formation method, the resulting film is subjected to a post-treatment which is appropriate for the protective layer forming material used. The protective layer comprised of a composite layer of the ultraviolet absorption layer and the hard coat layer can be formed by, for example, a method in which the hard coat agent is directly applied onto the ultraviolet absorption layer or a method in which the lamination is achieved through an adhesive.

The thickness of the protective layer differs depending upon the performances required for the ultraviolet absorption characteristics and hard coat characteristics. However, it is in the range of generally 0.1 to 100 $\mu$m and preferably 1 to 50 $\mu$m. When the protective layer is formed of a composite layer of the ultraviolet absorption layer and the hard coat layer, the overall thickness of respective layers also desirably falls within the foregoing range.

The polarization diffraction film of the present invention thus obtained has a distinctive effect that the diffracted light has a circularly polarizability, which the prior art optical components do not have. This effect makes it possible to extremely enhance the use efficiency of light by using the polarization diffraction film in a spectroscopic optical instrument which requires polarization such as an ellipsometer. A conventional spectroscopic optical instrument requiring polarization is necessarily provided with a polarizer because the light emitted from a light source has been required to be spectrally split into light components of different wavelengths by using a spectroscopic element such as a diffraction grating or a prism and then allowed to pass through a polarizer or to be spectrally split after being allowed to pass through a polarizer. The polarizer has presented a problem as follows: that is, it absorbs about 50% of the incident light and the reflection occurs at the interface, resulting in an extremely low use light efficiency. However, the polarization diffraction film manufactured by the method according to the present invention makes it possible to achieve very high, theoretically about 100% use light efficiency. Furthermore, the polarization diffraction film obtained by the inventive manufacturing method makes also possible to control the transmission and blocking of the diffracted light with ease by using a conventional polarizer. In general, a diffracted light having no polarizability can not be completely blocked even by using any polarizers in combination. Namely, with the polarization diffraction film, the diffracted light having a right-handed polarizability can be completely blocked only when a left-handed circularly polarizing plate is used. Thus, the complete blocking can not be achieved even by using any other polarizing plates. Because the film has such an effect, it makes it possible to allow the diffracted image to suddenly emerge from a dark filed or to suddenly disappear in the environment where an observer observes a diffracted image over the polarizing plate.

As described above, the polarization diffraction film obtained by the manufacturing method of the present invention has a very wide range of application as a novel diffraction function element and can be used as various optical elements and optoelectronic elements, decorative components and counterfeit preventing elements.

Specifically, the use of the polarization diffraction film can be extended to various optical uses by applying the film to a transparent and isotropic film, including, for example, a triacetyl cellulose film such as Fujitack manufactured by Fuji Photo Film Co., Ltd. or Konicatack manufactured by by Konica Corp., a TPX film manufactured by Mitsui Chemicals Inc., Arton film manufactured by Nihon Synthetic Rubber Co., Zeonex film manufactured by by Nippon Zeon Co., Ltd. or Acryprene film manufactured by Mitsubishi Rayon Co., Ltd. used as the second substrate. For example, in the case where various liquid crystal displays are provided with the polarization diffraction film, it can be improved in color compensation and/or viewing angle. Furthermore, the polarization diffraction film has extensive uses as the foregoing spectroscopic optical instrument requiring a spectrally split polarization light, a polarization optical element to be used for obtaining a light ray of a specific wavelength by utilizing diffraction phenomenon, an optical filter, a circularly polarizing plate or a photodiffusion sheet. Still furthermore, a linearly polarizing plate can also be obtained by combining the film with a quarter-wave plate. Thus, the polarization diffraction film manufactured by the inventive method can provide various optical components capable of exerting unprecedented optical effects as the optical elements and optoelectronic elements.

With the polarization diffraction film, there can be obtained various forming materials such as a novel designable film combining the rainbow coloration effect peculiar to the diffraction capability and the vivid coloration effect peculiar to the cholesteric liquid crystal. Alternatively, since the polarization diffraction film can be formed into a thin film, it can be expected to contribute in distinguish an existing product from other similar products by attaching or integrating the film to the existing product. For example, the polarization diffraction film embedded with a designed diffraction pattern may be stuck onto or a glass window or a glass window may be used as the second substrate for transferring. Whereby, the light resulting from selective reflection characteristics of the cholesteric liquid crystal associated with the diffraction pattern exhibits different colors depending on different visual angles. Thus, the resulting window becomes excellent in fashionability. Such a window can be provided that it is difficult to see the inside thereof from the bright outside, nevertheless, the visibility is good when seeing from the inside to the outside.

The counterfeit prevention element can be used as a novel counterfeit prevention film, seal, label or the like all of which combine respective counterfeit prevention effects obtained by the diffraction element and the cholesteric liquid crystal. Specifically, the counterfeit prevention element can be obtained by applying the polarization diffraction film onto a card-shaped substrate or mount used as the second substrate for transferring or attaching, such as a driver's license, an identification card, a passport, a credit card, a pre-paid card, various notes, gift cards and securities. The polarization diffraction film may be integrated in one piece with or disposed in a part of the card substrate or mount, more specifically may be stuck on, embedded in the card substrate or mount or woven therein when the card substrate or mount is made of paper. The polarization diffraction film manufactured by the inventive method has a region exhibiting a diffraction capability in a part of the liquid crystal film and further combines the wavelength selective reflection characteristics, the circularly polarization selective reflection characteristics, the visual angle dependence of color and the effect of exhibiting beautiful cholesteric color, all of which are peculiar to the cholesteric liquid crystal. Therefore, it is very difficult to counterfeit the polarization diffraction film when used as a counterfeit prevention element. More specifically, it is extremely difficult to counterfeit a liquid crystal film having a region exhibiting a diffraction capability on its surface. Furthermore, the polarization diffraction film is excellent in designability because it has not only the counterfeit prevention effect but also the rainbow coloration effect of the diffraction element and the vivid coloration effect of the cholesteric liquid crystal. For these reasons, the polarization diffraction film manufactured by the inventive method is very suitable for use as a counterfeit prevention element.

These uses are merely one example of the polarization diffraction film manufactured by the inventive method. The polarization diffraction film can be applied and developed for various uses in which conventionally a diffraction element alone or a general cholesteric alignment-fixed liquid crystal has been used. Furthermore, the polarization and diffraction film can also be applied and developed for various uses other than the foregoing uses since it can exert novel optical effects.

EXAMPLES

The present invention will be described in details by way of examples below, which should not be construed as not to limit the scope of the present invention.

Reference Example 0.45 mol of biphenyldicarbonyl chloride, 0.055 mol of tetraphthaloyl chloride, 0.25 mol of methyl hydroquinone, 0.10 mol of catechol and 0.15 mol of hexamethylene glycol were allowed to react with each other in o-dichlorobenzene at 80° C. for 3 hours. Then, the reaction was stopped with 10 ml of water. Subsequently, the reaction solution was charged under stirring in methanol to carry out a reprecipitation operation, thereby obtaining a white liquid crystal polyester having an intrinsic viscosity of 0.147 with a phenol/tetrachloroethane (6/4 weight ratio) solvent of 30° C. The resulting polymer was washed and vacuum dried. The glass transition point temperature of the polymer was determined by means of DSC-7 manufactured by Perkin Elmer Corp., and was found to be 46° C.

Furthermore, the resulting polymer was dissolved in tetrahydrofuran and the acid value was determined by using bromphenol blue (pKa=4.1) as an indicator. As a result, the acid value of the polymer was found to be 150 μeq/g.

To 12 g of the polyester, was added 0.6 g of a melamine compound MX-57 manufactured by Sanwa Chemical Co., Ltd. and the mixture was dissolved in 87.4 g of tetrachloroethane to prepare a polymer solution. A polyimide solution manufactured by Nissan Chemical Industries, Ltd., under SE-5291 was applied onto a blue plate glass with a thickness of 1.1 mm by a roll coater and the solvent was dried out. The dried plate glass was subjected to a heat treatment at 300° C. for 1 hour to form a polyimide layer with a thickness of about 0.2 μm. The polyimide surface of the plate glass with the polyimide layer was subjected to a rubbing treatment with a rayon rubbing cloth and the polymer solution was coated on the surface by spin coating. Thereafter, the plate was dried sufficiently at 65° C. in an oven. Subsequently, the dried plate glass was placed in an oven to be heated at 120° C. for 10 minutes. Then, the glass plate was taken out from the oven and put into water to be quenched. The resulting sample was observed with a polarizing microscope. As a result, it was found that it was fixed in a substantially monodomain nematic liquid crystal phase where the molecules were uniaxially oriented along the rubbing direction. The in-plane retardation value determined by a Berek compensator was 165 nm. The thickness of the liquid crystal phase portion of the sample was determined by a contact type film thickness meter and was found to be 1.2 μm. The sample is hereinafter referred to as Sample 1.

Sample 1 was placed in an oven whose temperature was set at 180° C. and heated for 20 minutes to effect crosslinking. After the heat treatment, Sample 1 was allowed to cool down to room temperature. The resulting sample was observed again. As a result, it was found that the sample maintained the same homogeneous nematic alignment as that in Sample 1 and had an in-plane retardant value of 168 nm. The resulting sample is hereinafter referred to as Sample 2.

Only the liquid crystal layer of Sample 2 was scraped off. Then, the Tg after crosslinking was determined by differential scanning calorimetry (DSC). As a result, it wad found to be increased up to 77° C.

Example 1

7.8 g of a liquid crystal polymer A with an intrinsic value of 0.20 and an acid value of 250 μeq/g, obtained by a solution polymerization method, 2.2 g of a liquid crystal polymer B with an intrinsic viscosity of 0.11 and 0.6 g of a benzoguamine derivative SB-303 manufactured by Sanwa Chemical Co., Ltd., both having repeating units as represented by formulae given below were weighed out and dissolved in 90 g of N-methyl-2-pyrrolidine. Then, 0.5 mg of a fluorine-based surfactant S-383 manufactured by Asahi Glass Co., Ltd. was added to the solution. The mixture was coated on a polyethylene naphthalate (PEN) film whose surface had been subjected to a rubbing treatment with a rayon cloth by a bar coater. After coating, the film was placed in a clean oven whose temperature was set at 80° C. to be dried for 15 minutes, followed by a heat treatment in an oven whose temperature was set at 180° C. for 15 minutes thereby simultaneously completing the cholesteric alignment and crosslinking of the liquid crystal layer. This sample is hereinafter referred to as Sample 3.

Liquid crystal polymer B

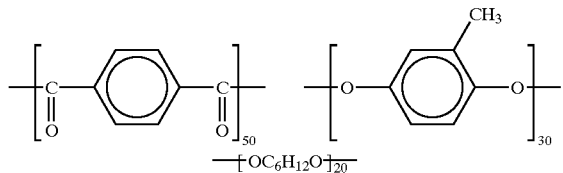

Liquid crystal polymer B

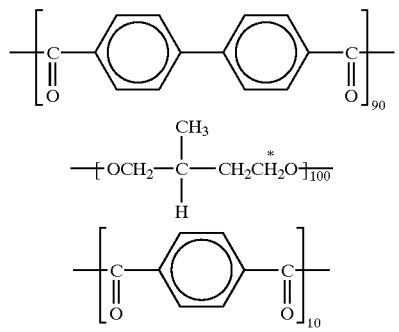

The cholesteric liquid crystal layer after the alignment treatment was fixed in a glassy state. The liquid crystal layer was scraped in a small amount off from the PEN film to be subjected to a DSC measurement. As a result, then Tg was found to be 95° C.

Selectively reflected light of green color from Sample 3 was able to be apparently confirmed even when seen from the front with the naked eye and a well-type transmission spectrum centering at 560 nm was also obtained from the measurement with a spectroscope manufactured under the name of V-570 by Nippon Bunko Co.,. Further, the cross section of the liquid crystal layer was observed with a transmission type electron microscope. This confirmed that such a cholesteric alignment was formed that the helical axes of the liquid crystal molecules were homogeneously parallel with each other in the direction of the thickness and the helical pitch lengths were homogeneously equal in the direction of the thickness.

Onto the surface of the liquid crystal layer of Sample 3 was coated an UV-setting adhesive UV-3400 manufactured by Toagosei Co., Ltd. with a thickness of 6 μm by a bar coater. Then, a triacetyl cellulose film manufactured by Fuji Photo Film Co., Ltd. with a thickness of 80 μm was laminated on the surface. Subsequently, the film laminate was irradiated from the PEN surface of the substrate with a light at 810 mJ by an ultraviolet irradiation apparatus equipped with a metal halide lamp. By this operation, the UV-setting adhesive was almost completely cured. Thereafter, the film laminate was placed on a table so that the triacetyl cellulose film surface faces the tabletop surface. Then, only the PEN film was gently peeled off from the film laminate at a peeling angle of 180° to transfer the liquid crystal layer onto the triacetyl cellulose film. The resulting film laminate is hereinafter referred to as Sample 4.

It was confirmed that Sample 4 was not different at all in terms of optical properties. The measurements conducted visually and with a spectroscope confirmed that the cholesteric alignment structure showed almost no change.

Sample 4 was cut into such a rectangle measuring 10 cm in length and 3 cm in width that the rubbing direction becomes longitudinal, while a polyethylene terphthalate (PET) film A-43 manufactured by Teijin Ltd., whose surface had been treated with silicone was cut into a rectangle measuring 12 cm in length and 5 cm in width. Then, both the rectangular pieces were superposed one on another so that the liquid crystal layer surface of Sample 4 was in contact with the silicone treated surface of the PET film. Both the rectangular pieces were fixed at one shorter side, namely transverse side with a cellophane tape. Then, the resulting sample was inserted through a thermolaminating apparatus DX-350 manufactured by Torami Co. so that the shorter side passed therethrough first. The thermolamination was carried out at a laminating roller temperature of 110° C. and the sample was carried at a speed of 30 mm per second. Thereafter, Sample 4 and the PET film were integrally in close contact with each other. The film laminate was then cooled down to room temperature to gently peel and remove the PET film therefrom along the direction of the film length. The resulting film is hereinafter referred to as Sample 5.

It was observed that Sample 5 exhibited the selective reflection derived from the cholesteric structure as Samples 3 and 4 had done. The transmittance measurement by a spectroscope also indicated no change in the well-type spectrum centering on 560 nm which Samples 3 and 4 had shown. Furthermore, the cross section of the liquid crystal layer was observed with a transmission electron microscope. This confirmed that such a cholesteric alignment was formed that the helical axes of the liquid crystal molecules were homogeneously parallel with each other in the direction of the thickness and the helical pitch lengths were homogeneously equal in the direction of the thickness.

From the foregoing, it was confirmed that the cholesteric alignment structure was not disturbed by the thermolaminating and thus the liquid crystal alignment was maintained.

Sample 3 was cut into such a rectangle measuring 10 cm in length and 3 cm in width that the rubbing direction was directed longitudinally, while a commercially available embossed film J52,989 manufactured by Edmond Scientific Japan Co. was cut into such a rectangle measuring 12 cm in length and 5 cm in width that the grating direction of a diffraction grating was directed longitudinally. Then, both the rectangular pieces were superposed one on another so that the liquid crystal layer surface of Sample 3 was integrally in contact with the diffraction grating surface of the embossed film. One shorter side of the superposed pieces was then fixed with a cellophane tape. Then, the resulting sample was inserted through a thermolaminating apparatus DX-350 manufactured by Torami Co. such that the shorter side passed therethrough first. The thermolamination was carried out at a laminating roller temperature of 95° C. and the sample was conveyed at a travel speed of 30 mm per second. After thermolaminating, Sample 3 and the embossed film were integrally in close contact with each other. The film laminate was then cooled down to room temperature to gently peel and remove the embossed film therefrom along the rubbing direction, i.e., the direction of the film length. The resulting film is hereinafter referred to as Sample 6.

Sample 6 has selectively reflected light characteristic of the cholesteric alignment similarly to Sample 3. Evaluation of the transmission spectrum by a spectroscope V-570 manufactured by Nippon Bunko Co. indicated no change in the well-type spectrum centering at 560 nm. The alignment state of the liquid crystal layer of Sample 6 was observed with a polarizing microscope and the cross section of the liquid crystal layer was observed with a transmission electron microscope. These observations confirmed that in the surface region of the liquid crystal layer, such a cholesteric alignment was formed that the helical axes of the liquid crystal molecules in a cholesteric phase were not homegeneously parallel with each other in the direction of the thickness and the helical pitch lengths were not homogeneously equal in the direction of the thickness. Whereas in other regions, such a cholesteric alignment was formed that the helical axes of the liquid crystal molecules were homogeneously parallel with each other in the direction of the thickness and the helical pitch lengths were homogeneously equal in the direction of the thickness.

Furthermore, it was observed that other than the selective reflection derived from the cholesteric structure, Sample 6 exhibited rainbow light peculiar to the diffraction grating as seen from the 3 o'clock and 9 o'clock directions when the film length direction is directed in the 12 o'clock direction. When a collimated light from a He/Ne laser was made incident vertically to the PEM film surface of Sample 6, a diffracted light were observed in the 3 o'clock and 9 o'clock directions and the diffraction angle of the first-order diffracted light was about 30 degrees.

Comparative Example 1

Sample 7 was obtained by conducting the liquid crystal thin film formation, heat treatment and transfer operation in the same manner as in Example 1, except that no benzoguamine derivative was added to the liquid crystal material. Sample 7 also assumed the cholesteric alignment by which the green selectively reflected light can be seen as with Samples 3 to 5 of Example 2. The measurement by a spectroscope indicated that the selective reflection center was 545 nm.

Furthermore, Sample 7 was partially scraped off to be subjected to a DSC measurement. As a result, the Tg was found to be 72° C.

Sample 7 was also subjected to the thermosetting operation with a silicone treated PET film under the same conditions as in Example 2. The resulting sample is hereinafter referred to as Sample 8. Sample 8 appeared to be the same in the appearance such as the twist and shape of the film as Sample 5 of Example 1. However, the cholesteric selectively reflected light of Sample 8 could not be visually observed, as distinct from Samples 3 to 5 of Example 1 or Sample 7 before the thermolaminating in this comparative example.

By the measurement with a spectroscope, the well-type spectrum derived from selective reflection could not be confirmed, either. Furthermore, the film became turbid as a whole and the amount of transmitted light of the film itself was decreased. This confirmed that Sample 7 could not maintain the cholesteric alignment under the thermolaminating conditions.

Example 2

The following three types of acrylate monomers M1 to M3 were synthesized:

M1:
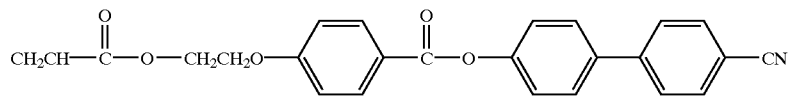

M2:
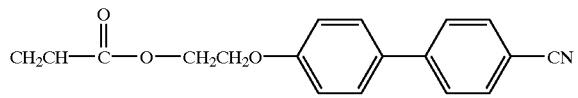

M3:
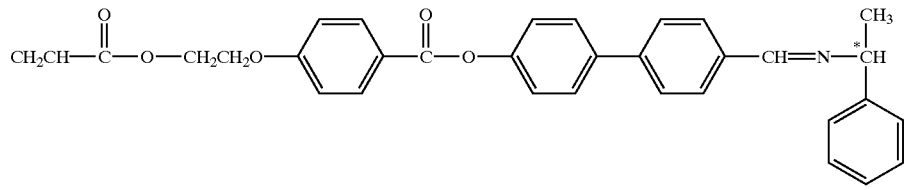

The monomers M1, M2 and M3 and an acrylic acid were mixed in a molar ratio of 50:20:30:5, respectively to prepare a chlorobenzene solution. The resulting solution was subjected to nitrogen gas bubbling for oxygen degassing. Thereafter, azobisisobutyronitrile (AIBN) in an amount of 2 weight % based on the monomer weight was weighed out to prepare a chlorobenzene solution and the resulting solution was added to the monomer solution. Then, the reactor was heated up to a temperature of 80° C. and the reaction was effected for 3 hours. Subsequently, 1 weight % of AIBN was additionally made into another solution to be added to the reactant. The mixture was reacted at 80° C. for 6 hours. The resulting reaction solution was charged in a 9-fold amount of diethyl ether to perform a reprecipitation operation. The resulting precipitate was redissolved in chloroform and then reprecipitated in diethyl ether. The precipitate thus obtained was well washed with diethyl ether, followed by drying for 24 hours in a vacuum dryer. The resulting polymer was subjected to a GPC analysis. The GPC analysis was carried out by using tetrahydrofuran as an eluent solvent and a Tosho GPC analyzing apparatus CCP & 8000 (CP-8000, CO-8000 and UV-8000) equipped with a filling column for high-speed GPC TSK gel G-1000HXL. The resulting polymer found to be a polymer having a weight-average molecular weight of about 7,000 in terms of polyethylene.

Furthermore, the polymer was subjected to a DSC analysis (DSC7 manufactured by Perkin Elmer Co.). As a result, the glass transition point temperature Tg was 70° C.

The polymer was examined for the liquid crystal phase behavior by using a Melter hot stage and an Olympus polarizing microscope. This examination indicated that the polymer assumed a nematic phase fluidizing at around 100° C. and showed partially an oily streak texture characteristics peculiar to the cholesteric liquid crystal phase. The isotropic transition temperature of the polymer was in the vicinity of 240 to 250.

Onto a commercially available triacetyl cellulose film UVD-80 manufactured by Fuji Photo Film, was coated an aqueous solution of polyvinyl alcohol MP-203 manufactured by Kuraray Co., Ltd., followed by drying to obtain a film with a thin coat layer formed thereon. The polyvinyl alcohol surface of the resulting film was subjected to a rubbing treatment with a rayon cloth to prepare an alignment substrate. On the alignment substrate, was coated a 12 weight % tetrachloroethane solution of a mixture of 10 g of the liquid crystal polymer synthesized above and 0.6 g of a Sanwa Chemical melamine derivative MX-57 by spin coating. Then, the coated substrate was dried for 30 minutes on a 65° C. hot plate to form a 2.2 $\mu$m thick liquid crystal layer. The film thickness of the liquid crystal layer was determined with a contact type film thickness meter.

The film was heated for 10 minutes in an oven whose temperature was set at 120° C. to obtain a liquid crystal film. The film is hereinafter referred to as Sample 11. The observation of Sample 11 with a polarizing microscope revealed that it assumed a neat monodomain cholesteric alignment. The selective reflection derived from the cholesteric alignment in the vicinity of the green color in the visible light region was also observed even with the naked eye. The transmission spectrum determination of Sample 11 with a spectroscope V-570 manufactured by Nippon Bunko Co., indicated that the presence of a well-type transmission decreasing region derived from the selective reflection in the vicinity of 510 nm to 580 nm. The liquid crystal layer of Sample 11 was partially scraped off and subjected to a DSC analysis. As a result, the Tg was found to be increased up to 85° C.

Sample 11 was cut into such a rectangle measuring 10 cm in length and 3 cm in width that the rubbing direction was directed longitudinally, while a commercially available embossed film J52,989 manufactured by Edmond Scientific Japan Co.) was cut into such a rectangle measuring 12 cm in length and 5 cm in width that the grating direction of a diffraction grating was directed longitudinally. Then, both the rectangular pieces were superposed one on another so that the liquid crystal layer surface of Sample 11 was in contact with the diffraction grating surface of the embossed film. One shorter side of the superposed pieces was then fixed with a cellophane tape. Then, the resulting sample was inserted through a thermolaminating apparatus DX-350 manufactured by Torami Co. so that the shorter side passed therethrough first. The thermolamination was carried out at a laminating roller temperature of 95° C. and the sample was conveyed at a travel speed of 30 mm per second. After thermolaminating, Sample 11 and the embossed film were integrally in close contact with each other. The film laminate was then cooled down to room temperature to gently peel the embossed film therefrom along the rubbing direction. This is hereinafter referred to as Sample 12.

Sample 12 had selectively reflected light peculiar to the cholesteric alignment similarly to Sample 11. It was evaluated for the transmission spectrum by a spectroscope V-570 manufactured by Nippon Bunko Co. As a result, there was observed a region where a transmitted light derived from the selective reflection is decreased in the vicinity of 510 nm to 580 nm. The alignment state of the liquid crystal layer of Sample 12 was observed with a polarizing microscope and the cross section of the liquid crystal layer was observed with a transmission electron microscope. These observations confirmed that in the surface region of the liquid crystal layer, such a cholesteric alignment was formed that the helical axes of the liquid crystal molecules in a cholesteric phase were not homogeneously parallel with each other in the direction of the thickness and the helical pitch lengths were not homogeneously equal in the direction of the thickness. In other regions, such a cholesteric alignment was formed that the helical axes of the liquid crystal molecules were homogeneously parallel with each other in the direction of the thickness and the helical pitch lengths were homogeneously equal in the direction of the thickness.

Furthermore, it was observed with that other than the selective reflection derived from the cholesteric structure, Sample 12 exhibited rainbow light peculiar to the diffraction grating as seen from the 3 o'clock and 9 o'clock directions when the film length direction is directed to the 12 o'clock direction. When the collimated light from a He/Ne laser was made incident vertically from the triacetyl cellulose film surface of Sample 12, diffracted light was observed in the 3 o'clock and 9 o'clock directions and the diffraction angle of the first-order diffracted light was about 30 degrees.

As described above, according to the present invention, there can be manufactured a polarization diffraction film which is excellent in heat resistance and generates diffracted light which can be polarized.

What is claimed is:

1. A method for manufacturing a polarization diffraction film, comprising the steps of forming a film with a liquid crystal material containing a liquid crystalline polymer and a crosslinkable substance, fixing a cholesteric alignment formed with said liquid crystal material, crosslinking said liquid crystal material to form a liquid crystal film, and providing a region on at least a part of said liquid crystal film, wherein the region exhibits a diffraction capability and is a surface of said liquid crystal, and wherein said liquid crystal film is formed by dissolving said liquid crystal material in a solvent to form a solution; applying the solution onto a supporting film or substrate to form a coat layer, subsequently drying the coat layer to vaporize the solvent and form a dried film, subjecting the dried film to a heat treatment to form said cholesteric alignment, and conducting a cross-linking reaction of said liquid crystal material after said cholesteric alignment formation.

2. The method for manufacturing a polarization diffraction film according to claim 1 wherein said liquid crystalline polymer is selected from the group consisting of a main chain type liquid crystalline polymer compound, a side chain type polymeric compound, a liquid crystalline oligomer, which exhibits a nematic liquid crystal phase or a cholesteric liquid crystal phase, and a composition containing a copolymer or a mixture thereof.

3. The method for manufacturing a polarization diffraction film according to claim 2 wherein said main chain type liquid crystalline polymer compound which exhibits a nematic liquid crystal phase is selected from the group consisting of a polyamide, a polyamic acid, a polyimide, a polyester, a polyether, a polysulfide and a cellulose derivatives.

4. The method for manufacturing a polarization diffraction film according to claim 3 wherein said side chain type liquid crystalline polymer which exhibits a nematic liquid crystal phase is selected from the group consisting of polymers having a polysiloxane, polacrylate, polymethacrylate or polymalonate main chain and a low molecular weight liquid crystal compound comprised of a para-substituted cyclic compound as a mesogen bonded via a spacer comprised of conjugated atomic groups to the main chain.

5. The method for manufacturing a polarization diffraction film according to claim 2 wherein said main chain type and side chain type liquid crystalline polymers which exhibit a cholesteric liquid crystal phase are each selected from the group consisting of polymers obtained by introducing an optically active group into a main chain, spacer or mesogen selected from the group consisting of a polyamide, a polyamic acid, a polyimide, a polyester, a polyether, a polysulfide and a cellulose derivatives.

6. The method for manufacturing a polarization diffraction film according to claim 1 wherein said crosslinkable substance is selected from the group consisting of a methacrylic compounds, an acrylic compounds, an urea compounds, a melamine compounds, a benzoguamine compounds, an azido compounds, an aziridinyl compounds and a blocked isocyanate compounds.

7. The method for manufacturing a polarization diffraction film according to claim 1 wherein the step of providing a region on at least a part of said liquid crystal film comprises transferring a diffraction pattern formed on a diffraction element substance onto said liquid crystal film.

8. A method for manufacturing a film laminate which comprises the step of attaching a polarization diffraction film manufactured by the method as described in claim 1, onto a substrate.

9. A method for manufacturing a film laminate which comprises the step of forming a protective layer containing an agent selected from the group consisting of an ultraviolet absorber and a hard coat agent, onto a polarization diffraction film manufactured by the method as described in claim 1.

10. The method for manufacturing a polarization diffraction film according to claim 1 wherein the step of providing a region on at least a part of said liquid crystal film comprises providing a diffraction pattern onto said liquid crystal film.

11. A method for manufacturing a polarization diffraction film, comprising the steps of forming a film with a liquid crystal material containing a liquid crystalline polymer and a crosslinkable substance, crosslinking said liquid crystal material which is in a cholesterically aligned state so as to form a liquid crystal film with a cholesteric alignment fixed, and providing a region on at least a part of said liquid crystal film, wherein the region exhibits a diffraction capability and is a surface of said liquid crystal, and wherein said liquid crystal film is formed by dissolving said liquid crystal material in a solvent to form a solution; applying the solution onto a supporting film or substrate to form a coat layer, subsequently drying the coat layer to vaporize the solvent and form a dried film, subjecting the dried film to a heat treatment to form said cholesteric alignment, and conducting a cross-linking reaction simultaneously with said cholesteric alignment formation.

12. The method for manufacturing a polarization diffraction film according to claim 11 wherein said liquid crystalline polymer is selected from the group consisting of a main chain type liquid crystalline polymer compound, a side chain type polymeric compound, a liquid crystalline oligomer, which exhibits a nematic liquid crystal phase or a cholesteric liquid crystal phase, and a composition containing a copolymer or a mixture thereof.

13. The method for manufacturing a polarization diffraction film according to claim 12 wherein said main chain type liquid crystalline polymer compound which exhibits a nematic liquid crystal phase is selected from the group consisting of a polyamide, a polyamic acid, a polyimide, a polyester, a polyether, a polysulfide and a cellulose derivatives.

14. The method for manufacturing a polarization diffraction film according to claim 12 wherein said side chain type liquid crystalline polymer which exhibits a nematic liquid crystal phase is selected from the group consisting of polymers having a polysiloxane, polacrylate, polymethacrylate or polymalonate main chain and a low molecular weight liquid crystal compound comprised of a para-substituted cyclic compound as a mesogen is bonded via a spacer comprised of conjugated atomic groups to the main chain.

15. The method for manufacturing a polarization diffraction film according to claim 12 wherein said main chain type and side chain type liquid crystalline polymers which exhibit a cholesteric liquid crystal phase are each selected from the group consisting of polymers obtained by introducing an optically active group into a main chain, spacer or mesogen selected from the group consisting of a polyamide, a polyamic acid, a polyimide, a polyester, a polyether, a polysulfide and a cellulose derivatives.

16. The method for manufacturing a polarization diffraction film according to claim 11, wherein said crosslinkable substance is selected from the group consisting of a methacrylic compounds, an acrylic compounds, an urea compounds, a melamine compounds, a benzoguamine compounds, an azido compounds, an aziridinyl compounds and a blocked isocyanate compounds.

17. The method for manufacturing a polarization diffraction film according to claim 11 wherein the step of providing a region on at least a part of said liquid crystal film comprises transferring a diffraction pattern formed on a diffraction element substance onto said liquid crystal film.

18. The method for manufacturing a polarization diffraction film according to claim 11 wherein the step of providing a region on at least a part of said liquid crystal film comprises providing a diffraction pattern onto said liquid crystal film.

* * * * *